United States Patent
Meyer et al.

(10) Patent No.: US 7,961,704 B2
(45) Date of Patent: Jun. 14, 2011

(54) PACKET SCHEDULING IN A RADIO ACCESS SYSTEM

(75) Inventors: Michael Meyer, Aachen (DE); Henning Wiemann, Aachen (DE); Rikard Thomasson, Molndal (SE); Mats Sagfors, Kyrkslatt (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 699 days.

(21) Appl. No.: 11/914,664

(22) PCT Filed: May 25, 2005

(86) PCT No.: PCT/EP2005/052403
§ 371 (c)(1),
(2), (4) Date: Nov. 16, 2007

(87) PCT Pub. No.: WO2006/125472
PCT Pub. Date: Nov. 30, 2006

(65) Prior Publication Data
US 2008/0192680 A1 Aug. 14, 2008

(51) Int. Cl.
H04B 7/00 (2006.01)
H04B 7/216 (2006.01)
H04J 3/24 (2006.01)
H04W 4/00 (2009.01)

(52) U.S. Cl. ......... 370/349; 370/310; 370/329; 370/335

(58) Field of Classification Search ................... 370/335, 370/342, 441, 328, 470, 349, 432, 312, 469; 455/423
See application file for complete search history.

(56) References Cited

U.S. PATENT DOCUMENTS

| | | | |
|---|---|---|---|
| 6,731,623 B2 * | 5/2004 | Lee et al. | 370/349 |
| 2002/0001296 A1 * | 1/2002 | Lee et al. | 370/338 |
| 2002/0064140 A1 * | 5/2002 | Numminen | 370/311 |
| 2002/0089952 A1 | 7/2002 | Cao et al. | |
| 2002/0128005 A1 * | 9/2002 | Aberg | 455/423 |
| 2002/0193106 A1 | 12/2002 | Koo et al. | |
| 2003/0007480 A1 * | 1/2003 | Kim et al. | 370/349 |
| 2005/0074024 A1 * | 4/2005 | Kim et al. | 370/432 |
| 2007/0229214 A1 | 10/2007 | Meirick et al. | |

FOREIGN PATENT DOCUMENTS

| | | |
|---|---|---|
| KR | 2003/0060027 A | 7/2003 |
| WO | WO 02/30064 A1 | 4/2002 |
| WO | WO 2004/043017 | 5/2004 |
| WO | WO-2006-002658 | 5/2006 |

* cited by examiner

*Primary Examiner* — Kwang B Yao
*Assistant Examiner* — Adam Duda

(57) ABSTRACT

A method of scheduling data for transmission over the air interface of a wideband code division multiple access network, said data being transported over the air interface on a downlink shared channel. The method comprises receiving data in the form of IP packets at a radio network controller, segmenting said IP packets into protocol data units, and forwarding said protocol data units from the radio network controller to a radio base station serving one or more user terminals. The radio network controller identifies to the radio base station the protocol data units belonging to a common IP packet. At the radio base station, each protocol data unit is scheduled for transmission over the air interface in dependence upon the IP packet to which it belongs.

7 Claims, 3 Drawing Sheets

PACKET SCHEDULING IN A RADIO ACCESS SYSTEM

FIELD OF THE INVENTION

The present invention relates to packet scheduling in a radio access system, and more particularly, though not necessarily, to packet scheduling for a high speed downlink shared channel of a wideband code division multiple access system.

BACKGROUND TO THE INVENTION

Compared to second-generation mobile communication systems, one of the most important aspects of third-generation mobile systems is enhanced packet-data access. The ITU standard known as wideband code division multiple access (WCDMA), Release 99, provides for data rates of 384 kbit/s for wide area coverage and up to 2 Mbit/s for hot-spot areas, which is sufficient for most existing packet-data applications. However, as the use of packet data services increases and new services are introduced, greater capacity will be required. WCDMA Release 5 extends the specification with, among other things, a new downlink transport channel that enhances support for interactive and background services, and, to some extent, streaming services, yielding a considerable increase in capacity compared to Release 99. Release 5 also significantly reduces delay and provides peak data rates of up to 14 Mbit/s. This enhancement, which commonly goes under the abbreviation, HSDPA (high speed downlink packet access), is the first step in evolving WCDMA to provide even more outstanding performance.

An important objective of the HSDPA design has been to retain the functional split introduced in Release 99 between layers and nodes. Minimal architectural changes should ensure a smooth upgrade and enable operation in environments where not every cell of the network supports the new functionality. Nonetheless, given that the key features are rapid adaptation to changes in the radio environment and fast retransmission of data, it follows that the corresponding functionality should be placed as close to the air interface as possible. The introduction of HSDPA therefore affects primarily the radio base station (RBS, also called Node B), in particular through the addition of a new medium access control sub-layer (MAC-hs). The architecture retains the radio network controller (RNC) functionality of Release 99. By switching channels in the RNC, the system can easily handle terminal movement from a cell that supports HSDPA to one that does not. That is, when switching a terminal from the high-speed downlink shared channel (HS-DSCH) to a dedicated channel (DCH) in a non-enhanced cell, the system ensures uninterrupted service, albeit at a lower data rate. Conversely, when a terminal enters a cell that supports HSDPA, the system can switch the terminal from a dedicated channel to the HS-DSCH. FIG. 1 illustrates schematically a WCDMA system with MAC-hs functionality.

The scheduler, which is part of the MAC-hs in the Node B, is a key element that determines the overall behavior of the system. For each transmission time interval (TTI) on the HS-DSCH, the scheduler determines which terminal (or terminals) the HS-DSCH should be transmitted to, and, in collaboration with the link adaptation mechanism, at what data rate. A significant increase in capacity can be obtained if, instead of allocating radio resources sequentially (i.e. so-called round-robin scheduling), the scheduler employs channel dependent scheduling: that is, the scheduler prioritises transmissions to terminals having favourable instantaneous channel conditions. By prioritizing these terminals, the network experiences mostly good conditions. The effect is greater diversity at the system level, hence the term "multi-user diversity". As load in the cell increases, the number of terminals queued for scheduling increases. This in turn raises the probability of being able to schedule transmissions to terminals with good channel quality.

In considering and comparing scheduling algorithms, it is necessary to distinguish between two kinds of variations in service quality:
rapid variations in service quality; and
long-term variations in service quality.

Rapid variations in service quality are due, for example, to multipath fading and variations in the interference level. For many packet-data applications, relatively large short-term variations in service quality are acceptable or go unnoticed. Long-term variations in service quality are due, for example, to changes in the distance between the terminal and the Node B. Such long-term variations should generally be minimised.

A practical scheduling strategy exploits the short-term variations while maintaining some degree of long-term fairness between users. In principle, system throughput decreases the more fairness is enforced. Therefore, a trade-off must be reached. Typically, the higher the system load, the greater the discrepancies between different scheduling strategies. Channel-dependent schedulers must estimate the instantaneous radio conditions of the terminal. Therefore, each terminal that uses high-speed services transmits regular channel quality reports to the Node B via the HS-DPCCH (high speed dedicated physical control channel, an uplink control channel). The scheduler might also use other information available in the Node B to assess terminal radio conditions.

HSDPA includes a new frame for transporting MAC-d PDUs from the RNC to the Node B. The UTRAN user-plane protocol termination points of HSDPA are illustrated in FIG. 2. The user-plane "flow" through the different layers (of FIG. 2) is illustrated in FIG. 3. RLC SDU's (, i.e. higher layer data units—typically IP packets) are segmented into RLC PDUs—RLC (and possibly MAC-d) headers are added in the RNC. The RLC/MAC-d PDUs are carried in Iub user-plane frames (not illustrated in the figure) to the Node B, where the MAC-d PDUs (MAC-hs SDUs) are queued in MAC-hs buffers (one or more buffers or queues are provided for each user terminal) for scheduled transmission over the air. [The Transport Network Layer (TNL) can be realised either with ATM or IP.]

Depending on the link quality and the amount of scheduled resources, different numbers of MAC-hs SDUs fit into a given transport block. The HSDPA scheduler in the Node B can be designed with many different objectives in mind. For example, a round-robin scheduler assigns equal resources to all active users without taking into account any differences in link quality, while a Maximum C/I scheduler always chooses the user with the best link quality. A Maximum-C/I scheduler delivers maximum cell throughput, but this scheduler can be very unfair to badly placed users in a loaded cell. Typically, some combination of the two extremes above, termed a "Proportional Fair" scheduler, is used. Typical inputs to the HSDPA scheduler include the MAC-hs buffer fill levels in the Node B and the CQI (link quality) reports from the user terminals.

SUMMARY OF THE INVENTION

A problem with the current HSDPA solution is the fact that the HSDPA scheduler lacks information identifying where a higher data layer data unit (e.g. IP packet) begins and ends. When a user terminal (or "UE" according to 3G terminology) is allocated resources by the scheduler, the MAC-hs can, depending on the link quality reported by the UE (CQI report), choose a suitable transport block size to be used in the next transmission interval. However, there is no means for the MAC-hs to know if a higher layer data unit has been fully transmitted or not. Since the RLC performs the segmentation (within the RNC) and re-assembly (within the UE), the end-user will not receive any direct benefit from the transmission until the whole IP packet has been fully transmitted. If only a part of an RLC SDU fitted into the scheduled transmission interval, the protocol layers above the RLC in the UE will not receive the RLC SDU before additional resources have been scheduled to the user. In a loaded cell, this will mean a significant delay.

To illustrate this problem, a scenario can be considered where twenty active users are sharing an HSDPA channel within a given cell of a WCDMA mobile network. For simplicity, it is assumed that all users have the same link-quality and that each user can have an instantaneous peak-data rate of 800 kbps if scheduled in a pure TDM-fashion. It is also assumed that all twenty users have one full IP packet of 1 kbyte in their MAC-hs buffers and that a Round-Robin-type scheduler for each 2 ms TTI is in use (a Maximum-C/I would do the exactly the same job, as no differences in link quality have been assumed).

The service time of a 1 kbyte packet over 800 kbps is 10 ms (5 TTIs). The aggregated buffers of all 20 users with 1 kbyte each will require a transmission capacity equivalent of 200 ms channel occupancy (100 TTIs). However, since the scheduling interval (TTI) is 2 ms, it means that the first IP packet will be successfully forwarded to upper layers only after 162 ms—the last one at 200 ms after transmission of the first scheduled unit. This is because the scheduler does not "know" the boarders of the IP packet, and the scheduler will allocate one TTI to each user at a time. Thus, the scheduler will schedule one segment of each packet to each user at a time. This results in a mean packet transfer time of 181 ms in the present example.

The problems with this approach to scheduling are further pronounced by HSDPA mobility. At HSDPA handover, the MAC-hs buffer is reset, resulting in all data stored in the MAC-hs buffer being deleted. In RLC acknowledged mode (AM) mode, lost data has to be re-transmitted leading to additional delays of partly transmitted RLC SDUs. In the above example, if it is assumed that an (arbitrary) UE is subject to a handover 120 ms after the first scheduling event, handover will always result in the loss of a partly transmitted packet, because all UEs will have a packet "in flight". For RLC unacknowledged mode (UM), lost MAC-hs fragments escalate into the loss of the full RLC SDU. Thus, with highly mobile equipment, it is beneficial to have as few partly transmitted RLC SDUs in flight, as this reduces the risk of losses at times of handover. Whilst the specified HSDPA "flow-control" mechanism between the Node B and the RNC can regulate the amount of data buffered in a MAC-hs—to reduce the amount of losses at times of handover—when scheduled, each IP packet should then be fully transmitted as soon as possible, to avoid the transmission being interrupted by a handover resulting in the loss of the partly transmitted packet.

According to a first aspect of the present invention there is provided a method of scheduling data for transmission over the air interface of a radio access network, said data being transported over the air interface on a downlink shared channel, the method comprising:

receiving data in the form of higher layer data units at a radio network controller;

segmenting and/or concatenating said higher layer data units into protocol data units;

forwarding said protocol data units from the radio network controller to a radio base station serving one or more user terminals, the radio network controller also identifying to the radio base station the boundaries of the higher layer data units within the protocol data units; and at the radio base station, scheduling each protocol data unit, or sub-units thereof, for transmission over the air interface in dependence upon the higher layer unit(s) to which the data contained in the protocol data unit or sub-unit belong(s).

The step of identifying to the radio base station the protocol data units belonging to a common higher layer data unit, may be carried out using in-band signaling, e.g. by including a special field in the user plane frame carrying the protocol data units. More particularly, a higher layer data unit length indicator may be included in the user plane frame header for each higher layer data unit, indicating the beginning and end of a sequence of RLC PDUs belonging to the higher layer data unit.

Alternatively, for each higher layer data unit, all of the RLC PDUs belonging to a given higher layer data unit may be included in the same user plane frame. RLC PDUs belonging to the more than one higher layer data unit may be included in the same frame, but only whole packets.

The invention is applicable to wideband code division multiple access radio networks in particular, e.g. 3G. However, it is also applicable to evolved 3G networks including Super 3G, 4G, as well as to EV-DO, EV-DV.

In the case of 3G (or an evolved 3G network using a similar channel configuration), said downlink shared channel is preferably a high speed downlink shared channel (HS-DSCH), and the interface between the radio network controller and the radio base station is the Iub interface. Preferably, said step of identifying to the radio base station the protocol data units belonging to a common higher layer data unit comprises implicitly or explicitly identifying this information in the Iub/Iur user plane frames or frame structure.

Said step of scheduling protocol data units for transmission over the air interface may comprise one of:

Prioritising MAC-hs queues including partly sent RLC SDUs over queues containing only completely unsent RLC SDUs.

Prioritising MAC-hs queues including on average small RLC SDUs over those MAC-hs queues including on average relatively large RLC SDUs.

Always scheduling sufficient resources to each MAC-hs queue to fully transmit at least one RLC SDU from a MAC-hs queue.

Choosing one or more transport block sizes suitable for carrying one or more scheduled RLC SDUs. This may be done dynamically.

Scheduling may also take into account other factors including, for example, the link-quality for a given user.

In a particular embodiment of the present invention, said higher layer data units are IP packets.

According to a second aspect of the invention there is provided a radio network controller for use in a radio access network, the controller comprising:

an input for receiving data in the form of higher layer data units at a radio network controller;

a processor for segmenting and/or concatenating said higher layer data units into protocol data units; and transmission means for forwarding said protocol data units to a radio base station serving one or more user terminals, said processor being arranged to identify to the radio base station the boundaries of the higher layer data units within the protocol data units.

According to a third aspect of the invention there is provided a radio base station for use in a radio access network, the radio base station comprising:

an input for receiving protocol data units sent by a radio network controller;

a processor for determining from information sent to the radio base station by the radio network controller, protocol data units belonging to a common higher layer data unit, and for scheduling each protocol data unit for transmission over the air interface in dependence upon the higher layer data unit to which it belongs.

According to a fourth aspect of the invention there is provided a method of transmitting data over the air interface of a radio access network, said data being transported over the air interface on a downlink shared channel, the method comprising:

receiving data in the form of higher layer data units at a radio network controller;

loading each higher layer data unit into a corresponding protocol data unit;

forwarding said protocol data units from the radio network controller to a radio base station serving one or more user terminals; and at the radio base station, segmenting the received protocol data units into data blocks, and scheduling each data block for transmission over the air interface in dependence upon the higher layer unit to which it belongs.

DETAILED DESCRIPTION OF CERTAIN EMBODIMENTS

Figure 1:
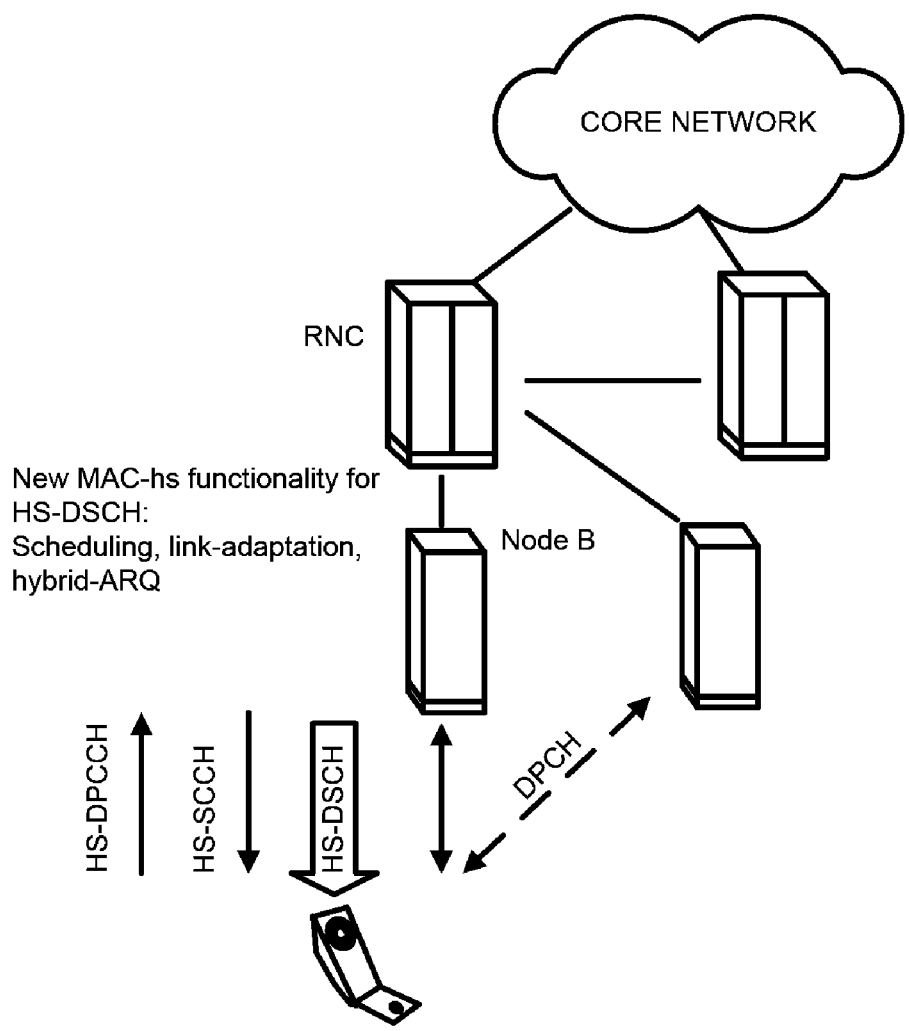
FIG. 1 illustrates schematically a WCDMA network including MAC-hs functionality.
Figure 2:
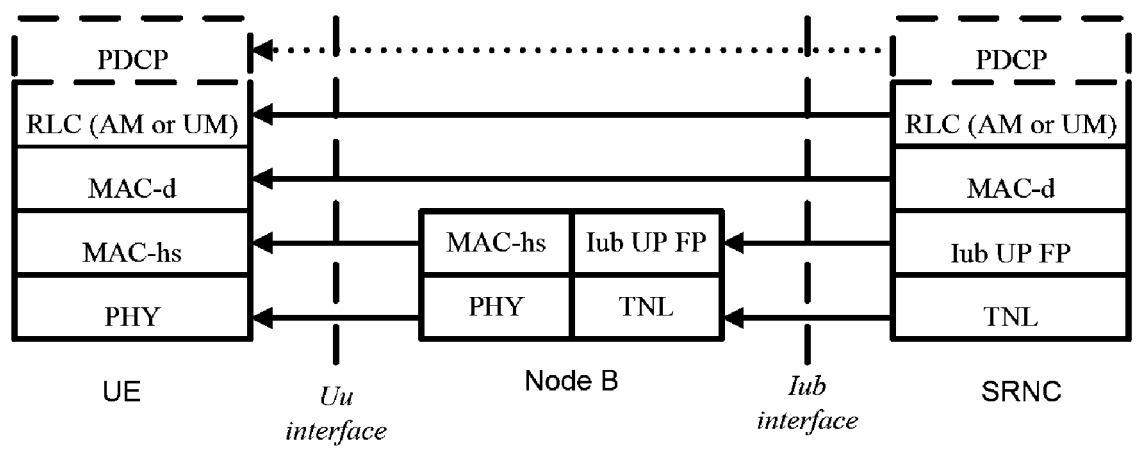
FIG. 2 illustrates schematically protocol termination points for the HS-DSCH of the WCDMA network of FIG. 1.
Figure 3:
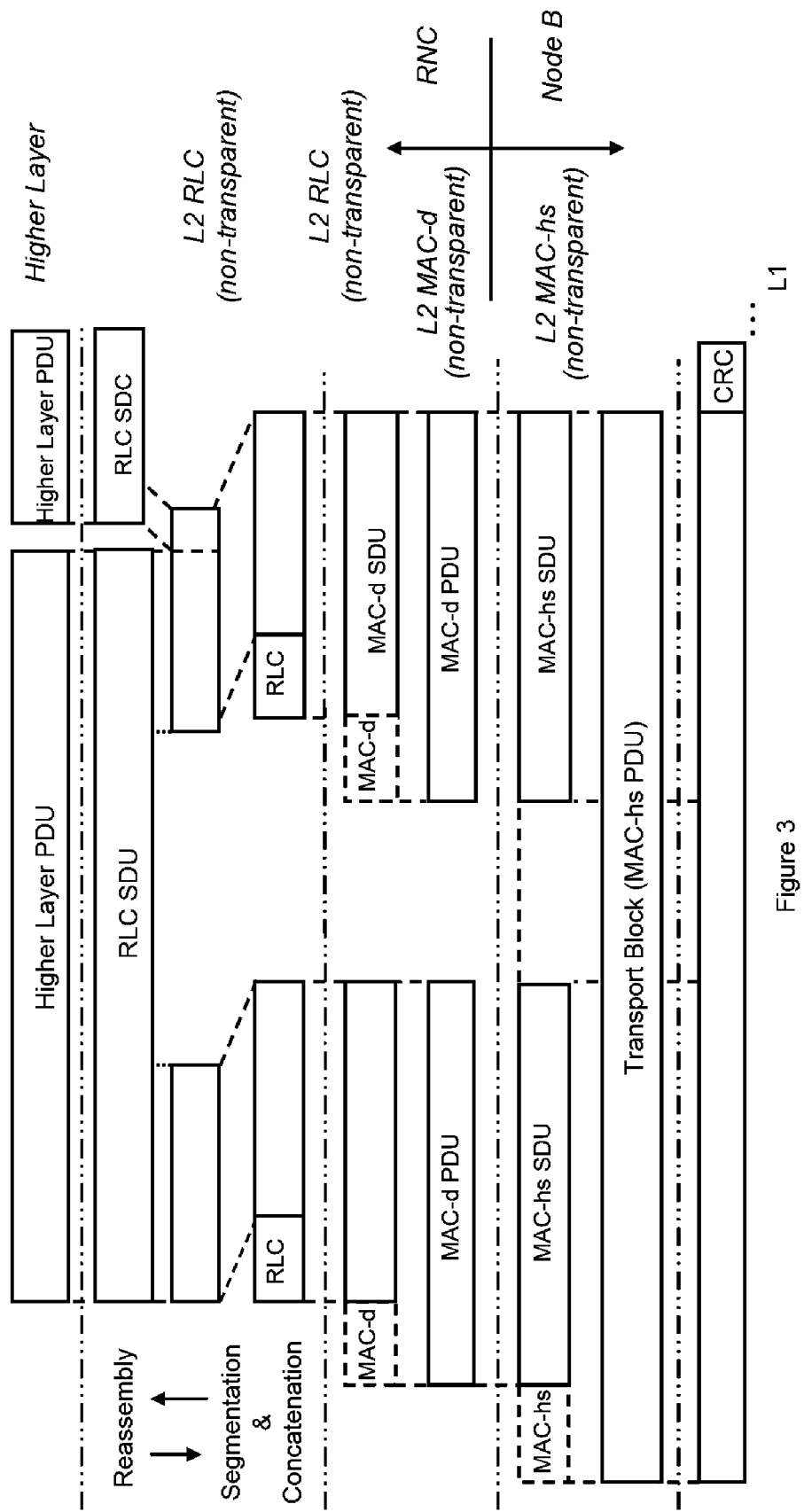
FIG. 3 illustrates schematically the user-plane data flow for the HS-DSCH.

A list of abbreviations used in this document follows:

| | |
|---|---|
| 3GPP | Third-generation Partnership Project |
| ARQ | Automatic repeat request |
| HSDPA | High-speed downlink packet access |
| HS-DSCH | High-speed downlink shared channel |
| HS-SCCH | High-speed shared control channel |
| MAC | Medium access control |
| PDU | Protocol data Unit |
| PF | Proportional-fair (scheduler) |
| RAB | Radio access bearer |
| RAN | Radio access network |
| RBS | Radio base station |
| RLC | Radio link control |
| RNC | Radio network controller |
| RR | Round-robin (scheduler) |
| RRC | Radio resource control |
| SDU | Service Data Unit |
| TCP | Transmission control protocol |
| TTI | Transmission time interval |
| UDP | User datagram protocol |
| UE | User equipment (mobile handset or terminal) |
| UMTS | Universal mobile telecommunications system |
| WCDMA | Wideband code-division multiple access |

The problems caused by the requirements of HSDPA to schedule the transmission of RLC PDUs at the radio base station or Node B have been considered above. The solution proposed here is to provide the Node B with information identifying the boundaries and sizes of RLC SDUs (e.g. IP packets). Whilst the Node B may or may not use this information in isolation, it does allow the Node B to make a more "intelligent" decision regarding the scheduling of RLC PDUs for transmission, thereby optimising the capacity offered by the HS-DSCH. The solution might be thought of as an "IP-centric" packet scheduling solution, and relies upon the fact that IP packet boarders are "known" to the RNC.

Considering the example discussed above, with twenty active users are sharing an HSDPA channel within a given cell of a WCDMA mobile network, the benefits of the IP-centric approach can be quantified. If the scheduler knows the IP packet borders, it can invest 5 TTI:s for each UE at a time, thereby completing the sending of the first packet in 10 ms and the last one 200 ms after the first scheduling event. The IP centric scheduler results in a mean packet transfer time of 105 ms. Considering the case of a UE subject to a handover 120 ms after the first scheduling event, for the IP centric scheduler, this will result in the loss of a packet in less than 50% of cases, as more than 50% of the UEs will already have received their IP packet in full prior to the handover.

The information identifying the IP packet boundaries needs to be transferred to the Node B, and can be done either explicitly or implicitly, as follows.

Explicitly: This involves including a Length Indicator (LI) in the Iub/Iur user-plane frame structure for the HS-DSCH, which indicates where an RLC SDU begins and where it ends. Formally, this requires an interface between RLC/MAC/FP to forward the RLC length indicator information (held within the RNC) from the RLC layer to the Iub/Iur user-plane frame protocol. The new LI is then carried in the HS-DSCH Iub frame (header or header extension). Such a solution could potentially be included in the 3G TS 25.435.

Implicitly: This requires that the Iub/Iur user-plane frame-protocol implementation be designed to always send the RLC PDUs belonging to a common RLC SDU within the same Iub/Iur user-plane frame. This solution could easily be implemented without the need for standardisation (although the solution could also be standardized as an "Iub/Iur service option"). If RLC concatenation is performed such that a single RLC PDU can contain data from two successive RLC SDUs, this rule may be modified to allow the last RLC/MAC PDU in a frame to contain concatenated data from the subsequent RLC SDU.

Regardless of how the IP packet boundary information is transmitted to the Node B, the NodeB scheduler utilises the (new) information in its scheduling decisions. The scheduler may still use a number of different criteria in deciding upon which MAC-hs queue to schedule next. For example, fairness aspects need to be considered, and the aspect of link quality dependent scheduling should still be accounted for. Specific scheduling strategies could include:

Prioritising MAC-hs queues including partly sent RLC SDUs over queues containing completely unsent RLC SDUs, such that the MAC-hs queue which is estimated to require the least resources to finalise the transmission of the partly sent RLC SDU is transmitted first. This ensures that the transmission of a partly transmitted IP packet is resumed as soon as possible—possibly by balancing other scheduling criteria with the present one.

Prioritising the scheduling of resources to MAC-hs queues including small RLC SDUs over those MAC-hs queues including large RLC SDUs. This makes use of the assumption that small packets tend to belong to time-sensitive applications, or to connection establishments.

A particular scheduler for Conversational Class Radio Access Bearers realised with RLC UM, such that the scheduler always schedules enough resources to each MAC-hs queue to fully transmit at least one RLC SDU.

Each of these prioritisation schemes may be combined with one or more other criteria for scheduling transmission from the MAC-hs queues. One such other criterion may be, for example, the link-quality, where a queue is prioritised depending to the amount of resources/TTIs that are estimated to be needed to transmit one or several complete RLC SDUs stored in the MAC-hs queue.

The term "prioritising" can in general terms be understood as "weighting"—in case there are many different aspects that the scheduler is accounting for (such as fairness, delay, link quality . . . ).

Rather than use an approach that selects RLC PDUs individually according to whether or not they belong to an RLC SDU that is already in-flight, an HS-DSCH transport block selection mechanism can be utilised which chooses a transport block size that can include one or several full IP packets. The MAC-hs "fills" transport blocks with RLC PDUs belonging to the same IP packet, using the information received from the RNC.

It is noted that an implicit requirement of the approach described here is that the re-transmission of data over the air interface is prioritised ahead of the transmission of RLC PDUs belonging to completely unsent RLC SDUs, as retransmissions will of course belong to "in-flight" RLC SDUs.

A particular implementation is a realization of RLC UM over HS-DSCH together with IP centric scheduling to minimize packet-losses at times of handover.

Figure 4:
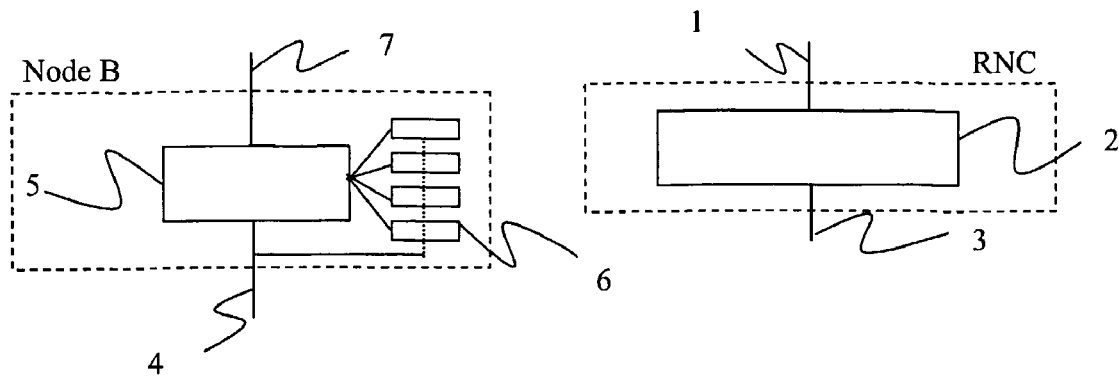
FIG. 4 illustrates functional components of a Node B and of a radio network controller of the WCDMA network of FIG. 1.
Figure 5:
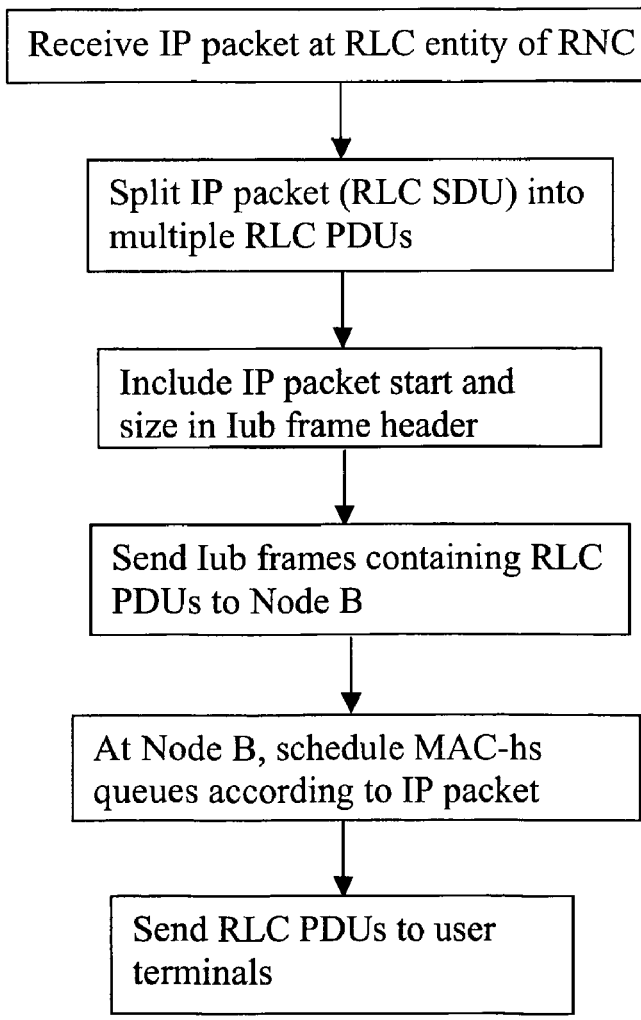
FIG. 5 is a flow diagram illustrating the main steps in a method of scheduling data for transmission over the DS-DSCH.

FIG. 4 illustrates schematically the main functional components of the radio network controller and the Node B. These include, for the radio network controller: an input 1 for receiving IP packets; a processor 2 implementing the RLC entity; and an output 3 coupled to the physical transport network. For the Node B, the figure illustrates: an input 4 coupled to the physical transport network; a processor 5 which receives the RLC PDUs from the input 4, and an output 7 coupled to the base station transmitter for sending data over the air interface. The processor 5 operates as a scheduler, scheduling the transmission of RLC PDUs from the various MAC-hs buffers 6. FIG. 5 is a flow diagram illustrating the main steps in the mechanisms described above.

The exemplary implementations described above provide the following potential advantages:

The proposed HSDPA IP-centric scheduler provides lower per-packet delay on average compared to existing schedulers.

It results in fewer outstanding and partly transmitted RLC SDUs, which at times of HSDPA handover translates into lower delays for RLC AM and fewer losses for RLC UM.

Fewer losses for RLC UM translates into a smaller resource (capacity) wastage.

Fewer losses or lower delays result in better perceived quality for the end user.

The person of skill in the art will appreciate that various modifications may be made to the above described embodiment without departing from the scope of the present invention. In particular one might consider implementing a method where each higher layer data unit (e.g. IP packet) is packed into a single lower-layer protocol data unit. This would require a "flexible" RLC/MAC, which can accept any PDU/SDU sizes. Although this is not possible for current implementations of 3G, it may be possible for example in Super 3G).

In another embodiment of the invention, IP packets may be concatenated at the RNC without segmentation, i.e. one RLC PDU will contain two or more complete IP packets. Upon receipt of an RLC PDU at the Node B, the PDU will be segmented into data blocks or sub-units for transmission over the air interface. The RNC will identify to the Node B where IP packets begin and end within the PDU. The Node B will schedule a sub-unit for transmission in dependence upon the IP packet to which it belongs.

Further background information may be obtained from the following references:

3GPP TS 25.301, Radio Interface protocol architecture, Release 5.
3GPP TS 25.321, MAC, Release 5.
3GPP TS 25.322, RLC, Release 5.
3GPP TS 25.435, Iub UP FP for common channels, Release 5.

The invention claimed is:

1. A method of scheduling data for transmission over an air interface of a radio access network, wherein the radio access network is a 3G network or an evolution of 3G, said data being transported over the air interface on a downlink shared channel, the method comprising:

receiving data in the form of higher layer data units at a radio network controller;

segmenting and/or concatenating said higher layer data units into protocol data units;

forwarding said protocol data units from the radio network controller to a radio base station serving one or more user terminals, the radio network controller also identifying to the radio base station boundaries of the higher layer data units within the protocol data units, wherein said downlink shared channel is a high speed downlink shared channel, and an interface between the radio network controller and the radio base station is a Iub interface; and at the radio base station, scheduling each protocol data unit, or sub-units thereof, for transmission over the air interface in dependence upon the higher layer unit(s) to which the data contained in the protocol data unit or sub-unit belong(s), the scheduling further comprises one of prioritizing MAC-hs queues including partly sent RLC SDUs over queues containing only completely sent RLC SDUs, prioritizing MAC-hs queues including on average small RLC SDUs over those MAC-hs queues including on average relatively large RLC SDUs, always scheduling sufficient resources to each MAC-hs queue to fully transmit at least one RLC SDU from a MAC-hs queue, or choosing one or more transport block sizes for the downlink shared channel suitable for carrying one or more complete RLC SDUs for a given MAC-hs queue.

2. The method according to claim 1, wherein said step of identifying to the radio base station the protocol data units belonging to a higher layer data unit, is carried out using in-band signalling.

3. The method according to claim 2 and comprising including a higher layer data unit length indicator in a user plane frame header for each higher layer data unit, indicating a beginning and an end of a sequence of protocol data units belonging to the higher layer data unit.

4. The method according to claim 1, wherein, for each higher layer data unit, all of the protocol data units belonging to a given higher layer data unit are included in a user plane frame.

5. The method according to claim 1, wherein said radio access network is a 3G network or an evolution of 3G.

6. The method according to claim 1, wherein said step of identifying to the radio base station the protocol data units belonging to a common higher layer data unit comprises implicitly or explicitly identifying information in Iub/Iur user plane frames or frame structure.

7. The method according to claim 1, wherein said scheduling step also takes into account a link-quality for a given user.

\* \* \* \* \*

UNITED STATES PATENT AND TRADEMARK OFFICE
CERTIFICATE OF CORRECTION

| | |
|---|---|
| PATENT NO. | : 7,961,704 B2 |
| APPLICATION NO. | : 11/914664 |
| DATED | : June 14, 2011 |
| INVENTOR(S) | : Meyer et al. |

It is certified that error appears in the above-identified patent and that said Letters Patent is hereby corrected as shown below:

In Column 8, Line 48, in Claim 1, delete "lub" and insert -- Iub --, therefor.

In Column 10, Line 6, in Claim 6, delete "lub/lur" and insert -- Iub/Iur --, therefor.

Signed and Sealed this
Tenth Day of January, 2012

David J. Kappos
*Director of the United States Patent and Trademark Office*